United States Patent [19]
Christo

[11] 4,089,347
[45] May 16, 1978

[54] MIXING VALVE ANTI-SCALD APPARATUS

[75] Inventor: Christ Christo, Farmington Hills, Mich.

[73] Assignee: Masco Corporation of Indiana, Taylor, Mich.

[21] Appl. No.: 754,850

[22] Filed: Dec. 27, 1976

[51] Int. Cl.² .................. F16K 11/08; F16K 5/12
[52] U.S. Cl. .................... 137/625.41; 251/285; 251/288
[58] Field of Search .................... 251/288, 285; 137/625.41

[56] References Cited
U.S. PATENT DOCUMENTS

| | | | |
|---|---|---|---|
| 3,011,520 | 12/1961 | Barkelew | 251/285 X |
| 3,397,863 | 8/1968 | Bell | 251/285 |
| 3,674,048 | 7/1972 | Manoogian | 251/288 X |

*Primary Examiner*—Arnold Rosenthal
*Attorney, Agent, or Firm*—E. Dennis O'Connor

[57] ABSTRACT

Anti-scald apparatus for inclusion on a water mixing valve of the type commonly used in showers. The apparatus permits normal manual operation of the valve from an off position, through intermediate positions that allow mixtures of various proportions of hot and cold water to pass through the valve and toward the maximum temperature hot water position. However, the valve cannot be adjusted to reach this maximum temperature position without the performance of a positive, manual procedure by the valve operator, thereby reducing the possibility of accidental or inadvertent scalding. Stop means carried by the valve operating handle and easily accessible to the valve operator cooperate with a fixed stop on the valve to preclude valve adjustment beyond a predetermined high temperature setting until the stop means manually are disengaged. The stop means automatically will be repositioned in an operative position when the valve is adjusted to cooler water temperature settings than the setting at which the stop means and fixed stop become engaged.

11 Claims, 8 Drawing Figures

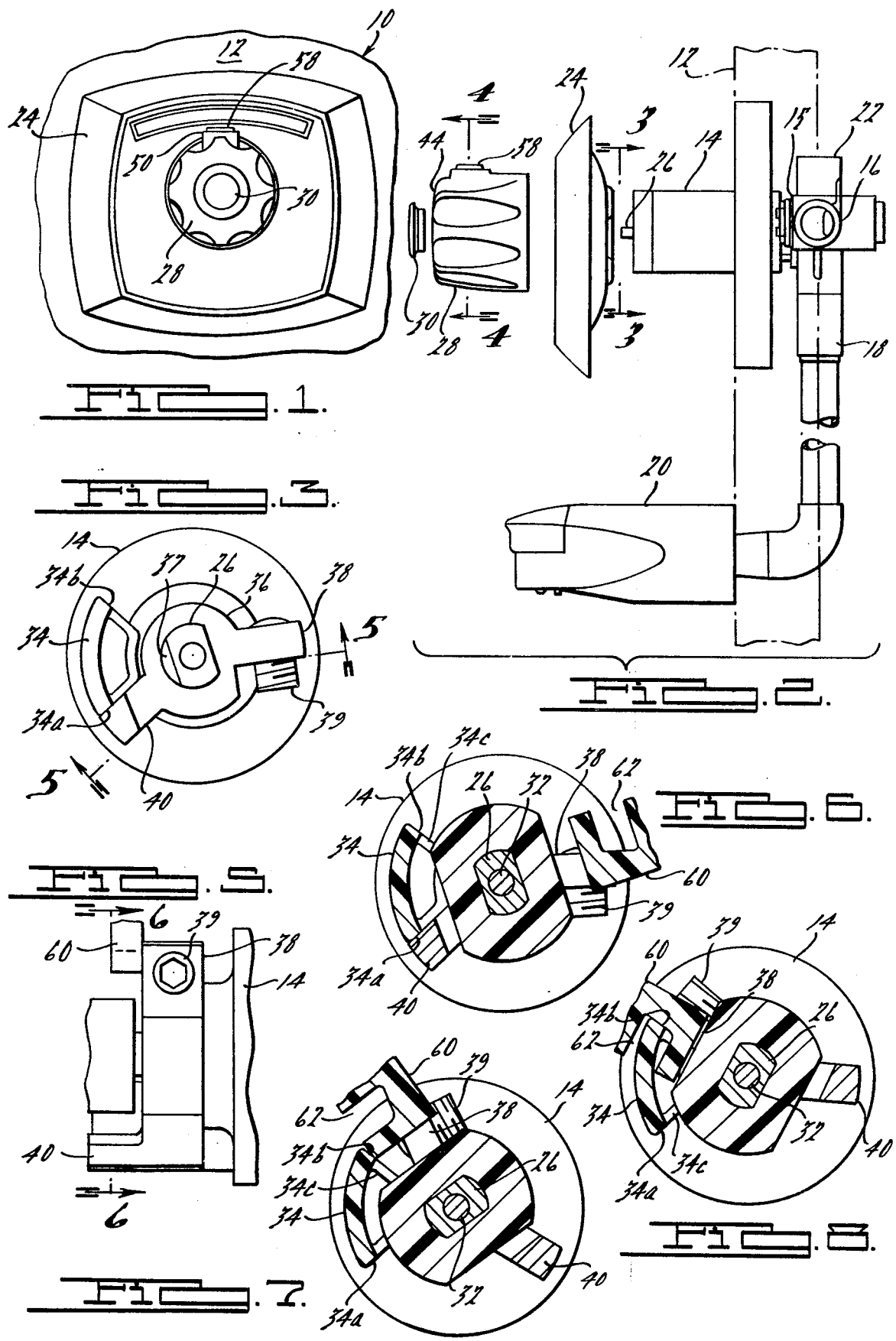

MIXING VALVE ANTI-SCALD APPARATUS

BACKGROUND OF THE INVENTION

Water mixing valves are widely used to control the flow of water discharged from bathtub spouts and shower heads. The popularity of mixing valves for such applications is due in large part to their simplicity and economy of design and construction, as well as quick familiarity and ease of operation by the user. As used in the trade, the term "mixing valve" refers to a valve connectable to sources of hot and cold water and which has the capability of being adjusted to vary the proportions of hot and cold water in the water flow passing through the valve. Mixing valves do not have the capability of controlling the volume of flow passing therethrough, but often are marketed and installed in conjunction with a second valve that performs the volume control function. An example of such a product offered commercially may be seen disclosed in U.S. Pat. No. 3,192,939, issued July 6, 1965.

Mixing valves have a single operating handle that manually can be rotated (most commonly counterclockwise) from an off position wherein no water passes through the valve, through various intermediate positions wherein cold water only or cold-hot water mixtures are passed, to a full on position passing only maximum temperature hot water through the valve. It is apparent that such an arrangement admits to the possibility of inadvertent or unintentional handle positioning in the full on, maximum temperature position due to accidental user contact with the operating handle or unfamiliarity with the temperature of water discharged at various handle positions. Discomfort or even injury to the user can result from such a situation.

In the past, mixing valve designs have been advanced including provisions to prevent unwanted operating handle positioning at high temperature settings. An example of such a design is disclosed by U.S. Pat. No. 3,011,520, issued Dec. 5, 1961. To my knowledge, such designs have not achieved commercial popularity, due possibly to design complexity adding substantially to the manufacturing costs of the mixing valve and/or inconvenience of operation of the anti-scald mechanism.

It is, therefore, an object of this invention to provide anti-scald apparatus for a water mixing valve that minimizes the possibility of undesirable discharge of high temperature hot water to the detriment of the valve operator. A further object of this invention is the provision of a design for such apparatus that allows economy and ease of manufacture of parts and assembly, with a minimum of tooling changes over the tooling used to manufacture similar mixing valves not including such apparatus. A still further object of this invention is the provision of mixing valve anti-scald apparatus of simple configuration with few moving parts that it is reliable in operation over the life of the mixing valve and provides easy familiarization of operation to the valve operator.

SUMMARY OF THE INVENTION

Anti-scald apparatus constructed in accordance with this invention is adapted for use with a mixing valve having a valve body connectable to sources of hot and cold water and a water output conduit, a rotatable valve operating stem protruding from the valve body and valve means within the valve body connected for movement with the stem to vary the proportions of hot and cold water passing through the mixing valve upon rotation of the stem. The anti-scald apparatus includes a fixed stop secured to the valve body near the stem, and spaced apart first and second movable stops secured to the stem for rotation therewith. The fixed stop is located in the path of movement of the first movable stop to limit rotational stem movement in one direction and is in the path of the movement of the second movable stop to limit rotational stem movement in the other direction. A manually operable handle is secured to the stem for rotational movement therewith and carries a third movable stop that rotates with the handle and is movable between a first position between the first movable stop and the fixed stop and a second position remote from the location between the first movable stop and the fixed stop. This arrangement provides that the third movable stop abuts the fixed stop to prevent rotational stem movement in the one direction prior to abutment between the fixed stop and the first movable stop when the third movable stop is in the first position. When the first movable stop manually is postioned in the second position, stem rotation until abutment between the first movable stop and the fixed stop can occur.

DESCRIPTION OF THE DRAWINGS

FIG. 1 is a front view of a hot and cold water mixing valve including anti-scald apparatus according to this invention;

FIG. 2 is a side view of the mixing valve of FIG. 1, including associated plumbing fixtures, with certain parts exploded for purposes of clarity;

FIG. 3 is a view taken along the line 3–3 of FIG. 2;

FIG. 5 is a view taken along the line 5–5 of FIG. 3;

FIG. 6 is a section view taken along the line 6–6 of FIG. 5, and showing the mixing valve in the off position;

FIG. 7 is a view similar to FIG. 6, but showing the mixing valve in an intermediate position with the anti-scald apparatus of this invention engaged to prevent further valve movement to increase water temperature; and FIG. 8 is a view similar to FIG. 7, but showing the anti-scald apparatus of the invention disengaged and the valve in the maximum temperature, full hot water position.

DETAILED DESCRIPTION OF THE INVENTION

Figure 4:
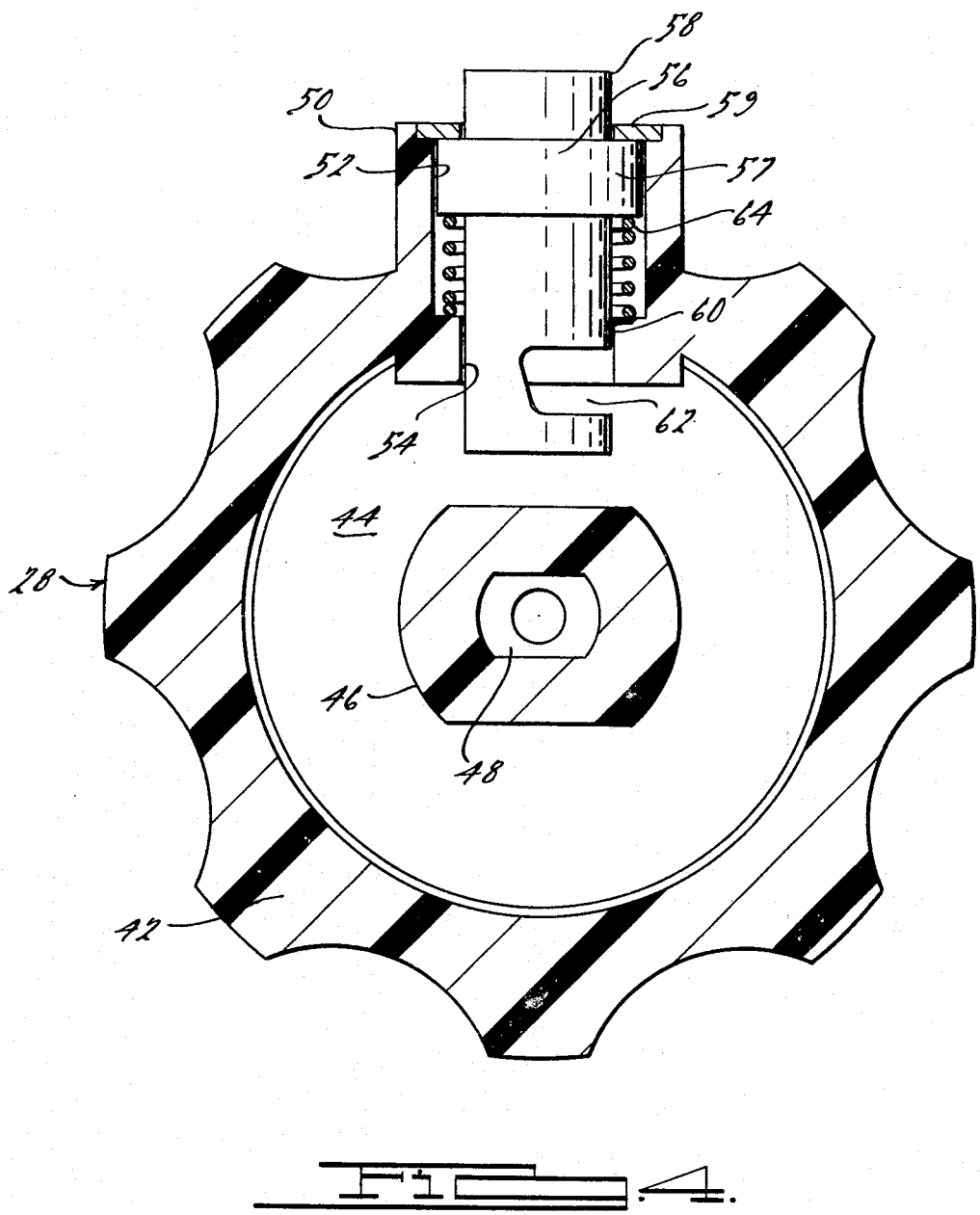
FIG. 4 is a section view taken along the line 4–4 of FIG. 2.

Referring now in detail to the drawings, and in particular to FIGS. 1 and 2, the numeral 10 denotes generally a mixing valve assembly including anti-scald apparatus in accordance with this invention. This mixing valve assembly is illustrated as installed on a bathroom wall 12 that most commonly is the wall at the head of a bathtub and shower stall. The mixing valve body 14 extends through the wall and is secured to a plumbing fixture 15 that includes a cold water input conduit 16, a hot water input conduit (not shown), an output conduit 18 in communication with a tub spout 20 and an alternate output conduit 22 in communication with a shower head (not shown). All of the conduits that are part of the plumbing fixture are in fluid flow communication with a valving mechanism within valve body 14. An apertured, decorative escutcheon plate surrounds the valve body on the outer side of the wall. A valve operating stem 26 extends from the end of valve body 14 remote from plumbing fixture 15 and receives a manual operating handle 28 as will be explained in detail below. This handle is secured to the stem by a screw fastener 32 (FIGS. 6–8) with a decorative, snap-in handle center piece 30 covering fastener 32 from sight.

As may be seen in FIG. 3, a fixed stop 34 projects from valve body 14 and is located radially outwardly from the axis of stem 26. Fixed stop 34 includes outer stop surfaces 34a and 34b. A movable stop member 36 has an aperture 37 formed through the central portion thereof that receives stem 26. Because the outer surface of stem 26 includes diametrically opposed flats, one of which mates with a flat surface that partially defines opening 37, the movable stop member is secured for unitary rotational movement with stem 26.

A first movable stop 38 projects radially away from the axis of stem 26 from the main body of movable stop member 36. An adjustable set screw 39 projects through an internally threaded aperture in stop 38. A second movable stop 40 projects from the main body of stop member 36 and is angularly spaced from the first movable stop 38. As readily may be appreciated from FIG. 3, this arrangement of movable stops carried by and rotating with stem 26 allows stem rotation between the position shown in FIG. 3, wherein abutment between movable stop 40 and fixed stop surface 34a precludes further clockwise rotation of stem 26, and the position illustrated in FIG. 8, wherein the stem 26 has been rotated fully counterclockwise from the position of FIG. 3 until movable stop 38, or set screw 39 if it is adjusted to project from the side of stop 38 nearest fixed stop 34, abuts fixed stop surface 34b.

Stem 26 is operatively connected to valving means within mixing valve body 14 that control the flow and proportions of hot and cold water through the mixing valve. The valving means within valve body 14, as well as all of the structure heretofore described in this Detailed Description of the Invention comprise no part of the present invention and are disclosed and described in detail in U.S. Pat. No. 3,674,048, issued July 4, 1972, which is assigned to the assignee of this invention.

As is conventional, the valve means within valve body 14 are responsive to the position of stem 26 to prevent water flow through the valve when the stem is in the position of FIG. 3, which position may be described as the "off" position. As stem 26 is rotated counterclockwise from the off position of FIG. 3, the valving means progressively function in response to such rotation to allow the flow first of only of cold water through the valve, subsequently to allow mixtures of hot and cold water to flow through the valve (the proportion of hot water in such mixtures increasing with such counterclockwise movement), and finally to allow only the flow of hot water through the valve when stem rotation has occurred to the extent that movable stop 38 abuts fixed stop surface 34b. By adjustment of set screw 39 so that the set screw 39 will abut surface 34b before movable stop 38, such a "full on" hot water only condition may be precluded and the valve will pass a predominant hot water mixture, but one that still includes a small porportion of cold water. Thus, set screw 39 may be utilized to limit the maximum temperature of water that can pass through the valve, an adjustment that is known in the art. It should be noted, however, that even utilizing the temperature adjustment provided by set screw 39, it is common that the maximum temperature is sufficient to cause discomfort and possibly harm to the valve operator, especially if the supply of cold water to the mixing valve is somewhat restricted as may occur when cold water is being drawn at a different location, but from the same plumbing system that includes mixing valve 10.

The function of the anti-scald apparatus of this invention is to prevent valve stem movement, and corresponding movement of the internal valving means, to the maximum high temperature position of FIG. 8 due to accidental or inadvertent application of force to handle 28. This is accomplished by mandating that a positive but simple manual task must be performed by the valve operator before the maximum high temperature position can be obtained.

The anti-scald apparatus is included mainly in structure carried by operating handle 28 and which may be appreciated by reference to FIGS. 2 and 4 of the drawings. Handle 28 has a cylindrical main body 42 that is closed at its outer end by wall 44. An internal central raised boss 46 projects from end wall 44 and has a centrally located opening 48 formed therein. Opening 48 has a configuration the same as the cross section of stem 26 such that the stem may be received within opening 48 during valve assembly so that the stem and handle 28 are joined for unitary rotation. Handle body 42 has a thickened boss 44 formed therein through which extends a bore having an outer large diameter portion 52, and an inner small diameter portion 54. It readily may be appreciated that all of the structure of handle 28 described in this paragraph may be a one piece, plastic molding capable of inexpensive manufacture.

An elongated button 56 has a large diameter portion 57 positioned within large bore portion 52, an intermediate diameter portion 58 that projects outwardly from boss 50 and a small diameter portion 60 that extends through the small diameter bore portion 54. Large diameter button portion 57 is retained within the bore of boss 50 by a washer 59 positioned on the outer extremity of the boss and held in place by conventional means such as adhesives or ultrasonic welding. The portion of small diameter button portion 60 that extends inwardly from boss 52 has a notch 62 formed therein. A spring 64 located within large bore portion 52 exerts a force on large button portion 57 urging button 56 radially outwardly from the center of handle 28, such outward movement being limited by washer 59.

It readily may be appreciated from FIG. 4 that button 56 may be depressed inwardly relative to the handle center by exerting a manual force on button portion 58 sufficient to overcome the resilient force of spring 64.

Handle 28 is assembled to stem 26 so that button portion 60 is positioned between fixed stop surface 34b and movable stop 38. As may be seen from FIG. 7, this arrangement provides that as handle and stem rotation counterclockwise from the off position of FIG. 3 continues, button portion 60 will contact stop surface 34b prior to set screw 39 or stop 38, effectively preventing further handle stem rotation toward the maximum hot water position. The position of parts of FIG. 7 provides a water mixture passing through the valve that has a sufficient proportion of cold water so that the temperature of this mixture will not be uncomfortable or dangerous to the valve operator.

Should the valve operator desire water discharge of a higher temperature than that provided when the valve parts are in the position of FIG. 7, button 56 may be depressed manually as explained above bringing notch 62 of button portion 60 into registry with fixed stop 34.

With the button 56 in this position, additional counterclockwise handle-stem rotation from the position shown in FIG. 7 is possible. This additional counterclockwise rotation occurs as the fixed stop 34 is received within the notch 62 and continues until movable stop 38 or adjustable set screw 39 contacts fixed stop surface 34b as shown in FIG. 8. FIG. 8 thus illustrates the maximum hot water valve adjustment position, which may be achieved only with due care on the part of the valve operator who necessarily performed a positive, manual task without which this maximum temperature value adjustment cannot be achieved.

When the valve is returned from the maximum water temperature position of FIG. 8 toward the off position by clockwise handle-stem rotational movement, button 56, due to the force exerted upon it by spring 64, automatically will move radially outward relative to the stem and into its original position once rotational movement between button portion 60 and fixed stop 34 is sufficient to cause removal of the fixed stop from the groove 62.

It thus may be seen that this invention provide antiscald apparatus for a water mixing valve that minimizes the possibility of undesirable discharge of high temperature water to the detriment of the valve operator. The anti-scald apparatus described herein has a design that allows economy and ease of manufacture and assembly of parts. Examples of this may be seen from the facts that handle 28 may be a one piece, plastic molding and that the anti-scald apparatus includes only two moving parts, button 56 and spring 64. Further, the anti-scald apparatus of this invention will be reliable in operation over the life of the mixing valve with which it is associated and easily may be manipulated by the valve operator by the simple expedient of pressing a button, a procedure which allows easy familiarization with the anti-scald operating procedure.

I claim:

1. Anti-scald apparatus for a mixing valve having a valve body connectable to sources of hot and cold water and a water output conduit, a rotatable valve operating stem protruding from said valve body and valve means within said valve body connected for movement with said stem to vary the proportions of hot and cold water passing through said mixing valve upon rotation of said stem, said apparatus including a fixed stop secured to said valve body proximate said stem, spaced apart first and second movable stops secured to said stem for rotation therewith, said fixed stop being located in the path of movement of said first movable stop to limit rotational stem movement in one direction and being in the path of movement of said second movable stop to limit rotational stem movement in the other direction, a manually operable handle secured to said stem for rotational movement therewith, a third movable stop carried by said handle for rotation therewith and movable between a first position between said first movable stop and said fixed stop and a second position remote from the location between said first movable stop and said fixed stop, whereby said third movable stop abuts said fixed stop and precludes rotational stem movement in said one direction prior to abutment between said fixed stop and said first movable stop when said third movable stop is in said first position, movement of said third movable stop between said first and second positions being independent of movement of said handle.

2. The apparatus of claim 1, including resilient force exerting means carried by said handle and exerting a force on said third movable stop urging said third movable stop toward said first position.

3. The apparatus of claim 2, wherein a portion of said third movable stop remote from said stem extends exteriorly of said handle, whereby said third movable stop can be manipulated manually between said first and second positions.

4. The apparatus of claim 1, wherein said third movable stop comprises a member having a groove formed therein opening toward said fixed stop, said groove being out of registry with said stop when said third movable stop is in the first position and in registry with and capable of receiving said fixed stop when said third movable stop is in the second position.

5. Anti-scald apparatus for a mixing valve having a valve body connectable to sources of hot and cold water and a water output conduit, a rotatable valve operating stem protruding from said valve body and valve means within said valve body connected for movement with said stem to vary the proportions of hot and cold water passing through said mixing valve upon rotation of said stem, said anti-scald apparatus including a fixed stop projecting from said valve body proximate said stem, first and second movable stops secured to said stem for rotation therewith and having portions thereof radially outward from the axis of rotation of said stem, said fixed stop being located in the path of movement of said first movable stop to limit rotational stem movement in one direction and being located in the path of movement of said second movable stop to limit rotational stem movement in the other direction, a manual operating handle secured to said stem for unitary rotational movement therewith with a portion of said handle being located radially outward of said stem, a third movable stop carried by said handle portion and extending radially inward toward said stem, said third movable stop being movable in said handle portion toward and away from said stem between a first position between said fixed stop and said first movable stop wherein said fixed stop is in registry with the path of rotational movement of said third stop upon rotation of said stem and a second position wherein said fixed stop is out of registry with the path of rotational movement of said third stop upon rotation of said stem.

6. The apparatus of claim 5, further including resilient means carried by said handle portion and exerting a force on said third movable stop urging said third movable stop toward said first position.

7. The apparatus of claim 6, wherein said third movable stop comprises an elongate member having a groove formed therein facing said fixed stop, said groove being out of registry with said stop when said third movable stop is in the first position and in registry with said fixed stop when said third movable stop is in the second position, such that said fixed stop may be received in said groove to permit stem movement in said one rotational direction until said first movable stop abuts said fixed stop when said third movable stop is in said second position.

8. The apparatus of claim 6, wherein said third movable stop comprises an elongate member having a groove formed therein facing said fixed stop, said groove being out of registry with said stop when said third movable stop is in the first position and in registry with said fixed stop when said third movable stop is in the second position, such that said fixed stop may be received in said groove to permit stem movement in said one rotational direction until said first movable stop abuts said fixed stop when said third movable stop is in said second position.

9. Anti-scald apparatus for a mixing valve having a valve body connectable to sources of hot and cold water and a water output conduit, a rotatable valve operating stem protruding from said valve body and valve means within said valve body connected for movement with said stem between an off position precluding water flow through said valve, intermediate positions permitting flow of cold water only and hot-cold water mixtures through said valve and a maximum hot water position remote from said off position and permitting flow of only hot water through said valve, said anti-scald apparatus including a fixed stop connected to said valve body proximate said stem, spaced apart first and second movable stops secured to said stem for rotation therewith, said fixed stop being located in the path of movement of said first movable stop to limit rotational stem movement in one direction and define said maximum hot water position and being in the path of movement of said second movable stop to limit rotational stem movement in the other direction and define said off position, a manually operable handle secured to said stem for rotational movement therewith, a third movable stop carried by said handle for rotation therewith and movable between a first position between said first movable stop and said fixed stop, wherein said third movable stop will abut said fixed stop when said stem is rotated in said first direction prior to said valve means reaching said maximum hot water position and preclude further stem rotation in said one direction, and a second position remote from the location between said first movable stop and said fixed stop, wherein said third movable stop does not impede stem rotation in said one direction to said maximum hot water position, and third movable stop control means operably connected to said third movable stop and accessible from exterior of said handle to permit manual movement of said third movable stop between said first and second positions.

10. The apparatus of claim 9, wherein movement of said third movable stop between said first and second positions is independent of movement of said handle.

11. The apparatus of claim 10, including resilient force exerting means carried by said handle and exerting a force on said third movable stop urging said third movable stop toward said first position.

* * * * *